United States Patent [19]
Kamiyama et al.

[11] 4,155,949
[45] May 22, 1979

[54] FIRE RETARDANT POLYCARBONATE RESIN COMPOSITION

[75] Inventors: Seiichi Kamiyama; Mitsuo Miura; Koji Takenaka, all of Tokyo, Japan

[73] Assignee: Mitsubishi Gas Chemical Company, Inc., Tokyo, Japan

[21] Appl. No.: 796,511

[22] Filed: May 13, 1977

Related U.S. Application Data

[63] Continuation of Ser. No. 648,501, Jan. 12, 1976, abandoned.

[30] Foreign Application Priority Data

Jan. 21, 1975 [JP] Japan ................................ 50-8972

[51] Int. Cl.² ........................... C08K 3/22; C08K 5/02
[52] U.S. Cl. .......................... 260/857 R; 260/45.7 R; 260/45.75 B; 260/45.95 G; 260/823; 260/897 A
[58] Field of Search .................. 260/45.75 B, 857 R, 260/823, 897 A, 45.7 RL, 45.95 G

[56] References Cited

U.S. PATENT DOCUMENTS

| | | | |
|---|---|---|---|
| 3,382,207 | 5/1968 | Jaquiss | 260/45.7 |
| 3,697,456 | 10/1972 | Pitts et al. | 260/2.5 AJ |
| 3,809,729 | 5/1974 | Reinhard | 260/45.7 RL |
| 3,855,277 | 12/1974 | Fox | 260/45.75 B |
| 3,941,758 | 3/1976 | Maul | 260/45.75 B |
| 3,965,214 | 6/1976 | Nametz | 260/45.75 B |
| 3,981,843 | 9/1976 | Yoshizaki et al. | 260/45.75 B |

OTHER PUBLICATIONS

Advances in Fire Retardants–Part 2–vol. 3, Progress in Fire Retardancy Series — 1973, pp. 99 to 119–Article by Schwarcz et al.

*Primary Examiner*—V. P. Hoke
*Attorney, Agent, or Firm*—Brooks, Haidt, Haffner & Delahunty

[57] ABSTRACT

A fire retardant polycarbonate resin composition comprises diantimony tetroxide and a polycarbonate member selected from the class of halogenated polycarbonates and a mixture of (1) a halogen compound and (2) a polycarbonate.

21 Claims, No Drawings

FIRE RETARDANT POLYCARBONATE RESIN COMPOSITION

This is a continuation of formerly co-pending application Ser. No. 648,501, filed Jan. 12, 1976, now abandoned.

BACKGROUND OF THE INVENTION

1. Field of the Invention

This invention relates to a fire retardant polycarbonate resin composition, and more particularly, to a fire retardant polycarbonate resin composition containing diantimony tetroxide.

2. Description of the Prior Art

Since polycarbonate resins have excellent thermal, electrical and physical properties, they are widely used in various fields. However, as the result of the recent strict regulation relative to physical properties of resins, even a polycarbonate resin known as a resin having well balanced excellent properties requires improvement in some properties. A typical property thereof is combustibility and UL 94 "Tests For Flammability of Plastic Materials For Parts In Devices And Appliances" (Underwriters Laboratories, Inc.) (hereinafter referred to as UL 94) is applied to resins as an authoritative standard for combustibility. According to UL 94, polycarbonate resins are self-extinguishing, but during combustion, the flaming particles drip, and they are classified in Self-extinguishing Group V-II depending upon the thickness of the test piece. Such combustibility is not desirable from a commercial point of view. Therefore, various efforts have been made to improve the fire retardancy.

The methods for improving the fire retardancy generally involve suppressing the combustibility by introducing an appropriate substituent into the polycarbonate molecule or adding a compound capable of suppressing the combustibility of the polycarbonate.

An example of the former method is disclosed in Japanese Patent Publication No. 24660/1972. The method comprises producing a polycarbonate containing, as monomeric units, 2,2-bis(4-hydroxy-3,5-dibromophenyl) propane and 2,2-bis(4-hydroxyphenyl) propane, and features using bromine as the substituent. However, when the content of 2,2-bis(4-hydroxy-3,5-dibromophenyl) propane monomer units increases, the moldability is disadvantageously lowered, though the fire retardancy increases. Moreover, the molding temperature is so high that bromine and/or a bromine compound is liberated and the resulting shaped article suffers from foaming and has a poor appearance resulting in lowering the commercial value.

Therefore, this method improves the fire retardancy at the expense of the excellent properties inherent to polycarbonate resins. It is not a desirable method.

An example of the latter method is incorporating a halogen compound into the polycarbonate resin. Japanese Patent Publication No. 44537/1972 discloses that a carbonate oligomer (average degree of polymerization being 2-10) derived from 2,2-bis(4-hydroxy-3,5-dibromophenyl) propane is added to a polycarbonate resin as the halogen compound taking the compatibility with the polycarbonate into consideration. According to this method, the migration of the halogen compound to the surface of the shaped article is less than that of other halogen compounds. However, when the amount of the carbonate oligomer is increased so as to enhance the fire retardancy, the impact strength and rigidity of the shaped article is disadvantageously lowered to a great extent. And this method is not desirable either because the improvement of fire retardancy is effected to the detriment of other properties of polycarbonate resins. Addition of diantimony trioxide together with the halogenated compound is known as a means for decreasing the amount of the halogenated compound to be added. When this method is applied to polycarbonate resin, the combustion can be retarded, but the thermal stability upon melt molding and physical properties of the molded articles are deteriorated, and further the appearance of the molded articles is markedly affected.

The present inventors have investigated the above mentioned drawbacks and found that diantimony trioxide reacts with the carbonate bond to degrade the polycarbonate and generate carbon dioxide, resulting in deterioration of the appearance of the molded articles. The degradation mechanism seems to be as shown below:

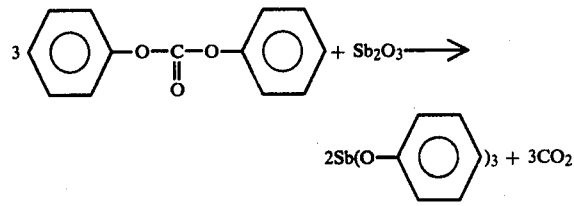

The present inventors have completed the present invention as the result of research in various antimony compounds.

SUMMARY OF THE INVENTION

According to the present invention, there is provided a fire retardant polycarbonate resin composition which comprises diantimony tetroxide and a member selected from the class of a halogenated polycarbonate and a mixture of a halogen compound and a polycarbonate.

According to another aspect of the present invention, there is provided a fire retardant for resins which comprises diantimony tetroxide and a halogenated polycarbonate oligomer having a recurring unit of the formula

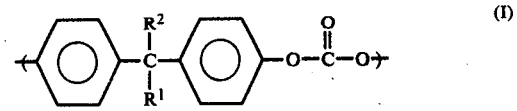

where $R^1$ and $R^2$ are similar or dissimilar and selected from the class of hydrogen and lower alkyl, and at least one halogen substituent is attached to at least one of the phenyl nuclei.

According to a further aspect of the present invention, there is provided a fire retardant resin composition which comprises a resin and a fire retardant comprising diantimony tetroxide and the above mentioned halogenated polycarbonate oligomer.

An object of the present invention is to provide a fire retardant polycarbonate resin composition free from deterioration of the thermal stability, physical properties and appearance of the molded articles.

Another object of the present invention is to provide an excellent fire retardant for resins which does not cause deterioration of the physical properties and appearance of the molded articles.

DESCRIPTION OF THE PREFERRED EMBODIMENTS

The polycarbonate utilized herein may be prepared by reacting a bis(hydroxyaryl) alkane with a carbonate precursor such as phosgene, diaryl carbonate and the like. A nuclear halogenated polycarbonate may be prepared by substituting a nuclear halogenated bis(hydroxyaryl) alkane for a part or all of the above mentioned bis(hydroxyaryl) alkane following the above mentioned preparation procedure.

Representative bis(hydroxyaryl) alkanes are 2,2-bis(4-hydroxyphenyl) propane, 2,2-bis(4-hydroxyphenyl) butane, 2,2-bis(4-hydroxyphenyl) pentane, and bis(4-hydroxyphenyl) methane.

Representative nuclear halogenated bis(hydroxyaryl) alkanes are 2,2-bis(4-hydroxy-3,5-dibromophenyl) propane, 2,2-bis(4-hydroxy-3,5-dichlorophenyl) propane, 2,2-bis(4-hydroxy-3,5-dibromophenyl) butane, 2,2-bis(4-hydroxy-3,5-dichlorophenyl) butane, 2,2-bis(4-hydroxy-3,5-dibromophenyl) pentane, 2,2-bis(4-hydroxy-3,5-dichlorophenyl) pentane, bis(4-hydroxy-3,5-dibromophenyl) methane, and bis(4-hydroxy-3,5-dichlorophenyl) methane.

These are used alone or in combination.

Polycarbonates also can be used for the present invention which have monohydric phenol groups at the ends of the chain. These end groups are derived from a monohydric phenol added as a chain terminater upon preparing the polycarbonate, such as pentachlorophenol, pentabromophenol, tetrachlorophenol, tetrabromophenol and the like. These polycarbonates thus terminated may be used in combination.

The polycarbonate or halogenated polycarbonate usually has at least 70 carbonate bonds. Nuclear halogenated polycarbonates having 2-70 carbonate bonds, preferably 2-50 carbonate bonds and, more preferably 2-10 carbonate bonds, are useful as a fire retardant for resins, together with diantimony tetroxide.

Diantimony tetroxide used in the present invention is composed of trivalent antimony oxide and pentavalent antimony oxide according to chemical analysis, but the diantimony tetroxide is different from a simple mixture of trivalent antimony oxide and pentavalent antimony oxide and is a particular substance having its own inherent crystal structure according to physical analysis. It appears as a white or light yellow powder.

Diantimony tetroxide may be prepared by oxidizing diantimony trioxide, antimonous acid, antimony sulfide, or metallic antimony at a temperature of 450° C.–1200° C., or by heating diantimony pentoxide at a temperature of 400° C.–1200° C.

The amount of diantimony tetroxide is usually 0.1–50 parts by weight, preferably 0.2–30 parts by weight, and more preferably 0.3–20 parts by weight per 100 parts by weight of the polycarbonate or halogenated polycarbonate. The amount of diantimony tetroxide is determined depending upon the degree of fire retardancy required for each particular use of the polycarbonate.

It is necessary according to the present invention that a halogen atom be present in the polycarbonate resin composition to impart the high fire retardancy thereto. Therefore, if the polycarbonate is not a nuclear halogenated polycarbonate or even if a nuclear halogenated polycarbonate is used but the halogen content is low, it is necessary to add a halogen compound. The halogen compound to be added may be a halogen series fire retardant, preferably an organic halogen compound containing at least 30% by weight of halogen and having a decomposition temperature not lower than 250° C.

Representative halogen compounds are hexabromobenzene, hexabromo-biphenyl, 2,2-bis(4-hydroxy-3,5-dibromophenyl) propane, pentachlorodiphenyl carbonate, pentabromotoluene, pentabromophenol, tetrabromophthalic anhydride, tetrabromodiphenyl carbonate, decabromodiphenyl carbonate, perchloropentacyclodecane, pentachlorophenol, pentachlorotoluene, decachlorodiphenyl ether, and decabromodiphenyl ether.

The amount of the halogen compound is usually not more than 20 parts by weight, preferably not more than 15 parts by weight and, more preferably not more than 10 parts by weight, per 100 parts by weight of the polycarbonate or halogenated polycarbonate.

The polycarbonate or halogenated polycarbonate may be modified by an appropriate resin. Representative resins for such modification are thermoplastic resins, for example, styrene resins such as acrylonitrile-styrene copolymer, acrylonitrile-chlorostyrene copolymer, acrylonitrile-polybutadiene-styrene copolymer, acrylonitrile-polybutadiene-chlorostyrene copolymer and the like, polymethacrylate resins such as polymethylmethacrylate and the like, polyolefine resins such as polyethylene, polypropylene, polyvinyl chloride and the like, polyamide resins, polyester resins, polyacetal resins, polyphenylene oxide resins and polysulfone resins.

The polycarbonate, diantimony tetroxide, halogenated compound, resin for modifying the polycarbonate and additives for the resin may be mixed by preliminarily blending a part or all of the above mentioned components with a high speed mixer or a tumbling mixer, or without blending preliminarily, and then kneading with an extruder, a Banbury mixer or kneading roll to produce the fire retardant polycarbonate resin composition.

According to the present invention, a combination of diantimony tetroxide and a halogenated polycarbonate oligomer is a useful fire retardant for resins.

The halogenated polycarbonate oligomer may be that having a recurring unit of Formula (I) above.

The halogenated polycarbonate usually contains 2–70 of the recurring unit and, preferably 2–10 recurring.

The amount of the fire retardant is usually added to a resin in an amount of 0.5–50 parts by weight, preferably 1–40 parts by weight and, more preferably 2–30 parts by weight per 100 parts by weight of the resin.

The amount of diantimony tetroxide is usually determined depending upon the amount of the halogenated polycarbonate, but is usually 1–50 parts by weight, preferably 3–45 parts by weight and, more preferably 5–40 parts by weight per 100 parts by weight of the halogenated polycarbonate oligomer.

This fire retardant may be effectively added to resins, for example, thermoplastic resins such as polyester resins, polyamide resins, polysulfone resins, styrene resins, methacrylate resins, polyolefine resins, polyacetal resins, polyphenylene oxide resins and the like.

The fire retardant of the present invention shows less migration and less deterioration of the resin than other fire retardants such as a combination of diantimony trioxide and a halogen compound. The lower migration seems to be due to the molecular weight of the halogenated polycarbonate being higher than that of other halogen compounds.

Further, when the fire retardant of the present invention is added to a resin, the resulting resin shows less thermal deterioration upon melting for molding, less lowering of the fire retardancy and less degradation of the appearance of the molded article than resins containing a fire retardant composed of a halogenated polycarbonate and diantimony trioxide.

The fire retardant may be added by conventional procedures. For example, the resin to be fire-retarded, the halogenated polycarbonate oligomer, diantimony tetroxide, and if desired, additives for resin are mixed by preliminarily blending a part or all of the above mentioned components with a high speed mixer or a tumbling mixer, or without blending preliminarily, and then kneading with an extruder, a Banbury mixer or kneading rolls.

Fire retardancy of the fire retardant polycarbonate resin composition and the fire retardant of the present invention may be determined by the method of UL 94 where the fire retardancy is classified into self-extinguishable groups V-0, V-I and V-II, depending upon the burning time after removing the fire source.

As another measuring method, there may be mentioned JIS K-7201, Determination of Oxygen Index.

As is clear from above, the combination of diantimony tetroxide with a halogen-containing polycarbonate resin composition of the present invention gives various excellent physical properties which are not anticipated by conventional fire retardant polycarbonates or fire retardant resin compositions containing a polycarbonate.

The following examples are given for explaining the feature of the resin composition according to the present invention. In the following examples, parts and percents are by weight unless otherwise specified.

REFERENCE EXAMPLE 1

Diantimony trioxide (supplied by Mikuni Seiren Co. Ltd.) was heated in an electric furnace at 500° C. for 3 hours and further at 800° C. for 3 hours in air and ground, and the powders passing through a 325 mesh-sieve were collected.

The resulting antimony oxide was subjected to X-ray analysis and it was found that the X-ray diffraction pattern of the antimony oxide was consistent that of diantimony tetroxide described in ASTM "Index to the X-ray Powder Data File Inorganic".

REFERENCE EXAMPLE 2

(A) In 100 parts of polybutadiene latex (gel content of 85%, polymer particle size of 0.3 microns, polybutadiene content of 54%) diluted with 170 parts of water was dissolved 0.72 parts of sodium dodecylbenzene sulfonate, and then 2.7 parts of acrylonitrile and 15.3 parts of monochlorostyrene were added and further 0.07 parts of potassium persulfate was added thereto. The resulting mixture was subjected to a graft polymerization in an emulsion under a nitrogen atmosphere at 60° C. for 7 hours to produce a latex of the graft polymer.

(B) A mixture of 15 parts of acrylonitrile, 85 parts of monochlorostyrene and 0.17 parts of t-dodecylmercaptan was continuously dropwise added to an aqueous solution of 2 parts of sodium dodecylbenzene sulfonate and 0.4 parts of potassium persulfate in 200 parts of water in a nitrogen atmosphere over 6 hours at 60° C. to effect copolymerization. After completion of the dropwise addition, the copolymerization reaction was carried out for a further 2 hours under the same conditions to obtain a latex of the copolymer.

(C) The graft polymer latex obtained in (A) above and the copolymer latex obtained in (B) were blended in such a manner that the polybutadiene content in the resulting latex was 20% based on the total solid matter. Further a dispersion of 2,6-di-t-butyl-p-cresol (45% content) was added thereto in an amount of 20% based on the polybutadiene solid. The latex thus blended was precipitated and separated followed by drying to obtain an acrylonitrile-polybutadiene-chlorostyrene resin (hereinafter referred to as "ABC resin").

EXAMPLE 1 and COMPARISON EXAMPLE 1

To 100 parts of polycarbonate (a carbonate copolymer derived from 2,2-bis(4-hydroxy-3,5-dibromophenyl) propane (8% by weight) and 2,2-bis(4-hydroxyphenyl) propane, molecular weight of 22,000) was added 1.5 parts of diantimony tetroxide as obtained in Reference Example 1 above, and the resulting mixture was thoroughly mixed. Then the resulting mixture was melted and kneaded by extruder to produce pellets of the resin composition. The pellets were molded by injection at a cylinder temperature of 270° C. or 290° C. to produce each of the sample pieces.

Physical properties, oxygen index determined according to JIS K-7201, and reduced viscosity of each sample piece are shown in Table 1 below. Upon determining the reduced viscosity, the antimony oxide was removed by dissolving the sample in dichloromethane and centrifuging. The measuring was conducted at a concentration of 0.3 g/100 ml. at 30° C. and the solvent was dichloromethane.

Repeating the above mentioned procedure except that 1.5 parts of diantimony trioxide (supplied by Mikuni Seiren Co. Ltd.) were employed in place of diantimony tetroxide, the resulting composition was measured as to the physical and other properties. The results are shown in Table 1 below as Comparison Example 1.

Table 1

| Antimony oxide | Example 1 Diantimony tetroxide | | Comparison Example 1 Diantimony trioxide | |
| --- | --- | --- | --- | --- |
| Molding Temperature (°C.) | 270 | 290 | 270 | 290 |
| Izod Impact Strength, ⅛" thick, with a notch (Kg.cm/cm) | 8.0 | 7.7 | 8.6 | 2.7 |
| Tensile Strength (Kg/cm$^2$) | 640 | 630 | 640 | 430 |
| Reduced Viscosity (g./l.) | 0.47 | 0.44 | 0.42 | 0.33 |
| Oxygen Index | 41 | 41 | 41 | 39 |

The oxygen index of a polycarbonate prepared from bisphenol A is 25, and therefore, referring to Table 1, it is clear that fire retardancy of each sample in Example 1 and Comparison Example 1 is improved to a great extent. However, at a higher molding temperature the sample piece containing diantimony trioxide shows lower impact strength, tensile strength and reduced viscosity. This shows that the thermal deterioration is marked in case of diantimony trioxide while such thermal deterioration is not found in case of diantimony tetroxide according to the present invention.

EXAMPLE 2 and COMPARISON EXAMPLE 2

100 parts of polycarbonate (a carbonate polymer derived from 2,2-bis(4-hydroxyphenyl) propane, molecular weight of 26,000) was mixed with 6 parts of decabromobiphenyl and 1.5 parts of diantimony tetroxide of Reference Example 1, and then melted and kneaded by an extruder to produce pellets of the resin composition. Repeating the injection molding procedure of Example 1 except that the cylinder temperature was 280° C. or 310° C., there were obtained the respective sample pieces. Ordinary physical properties and oxygen index were measured and the appearance was observed. The results are shown in Table 2 below.

For comparison, repeating the above mentioned procedures except that 1.5 parts of diantimony trioxide was used in place of diantimony tetroxide, the resulting composition was tested, and the results are shown in Table 2 below as Comparison Example 2.

Table 2

| Antimony oxide | Example 2 Diantimony tetroxide | | Comparison Example 2 Diantimony trioxide | |
|---|---|---|---|---|
| Molding temperature (°C.) | 280 | 310 | 280 | 310 |
| Izod Impact Strength, $\frac{1}{8}$" thick, with a notch (Kg.cm/cm) | 11.7 | 7.4 | 11.3 | 0.8 |
| Tensile Strength (Kg/cm$^2$) | 650 | 660 | 660 | 310 |
| Appearance of the molded article | No silver streak | No silver streak | Silver streak present | Silver streak present |
| Oxygen index | 43 | 42 | 43 | 40 |

As is clear from Table 2 above, when diantimony trioxide is employed, there occurs a remarkable thermal deterioration.

EXAMPLE 3 and COMPARISON EXAMPLE 3

60 parts of polycarbonate as used in Example 1, 40 parts of ABC resin of Reference Example 2, and 1.5 parts of diantimony tetroxide of Reference Example 1 were mixed, and then melted and kneaded by an extruder to produce pellets of the resin composition. The pellets were molded by injection at a cylinder temperature of 250° C. or 290° C. to produce each sample piece. Ordinary physical properties thereof were measured and a burning test according to UL 94 was conducted. The results are shown in Table 3 below.

For comparison, repeating the above mentioned procedures except that 1.5 parts of diantimony trioxide were used in place of diantimony tetroxide, there was obtained a test piece. The results of testing are shown in Table 3 below as Comparison Example 3.

Table 3

| Antimony oxide | Example 3 Diantimony tetroxide | | Comparison Example 3 Diantimony trioxide | |
|---|---|---|---|---|
| Molding temperature (°C.) | 250 | 290 | 250 | 290 |
| Izod Impact Strength, $\frac{1}{8}$" thick, with a notch (Kg.cm/cm) | 53 | 31 | 48 | 12 |
| Burning test (UL 94) | V-O | V-O | V-O | V-I |

When modified with a resin other than polycarbonate resin, the use of diantimony trioxide causes a thermal deterioration and further the fire retardancy effect is poor. When diantimony tetroxide is used, no deterioration is observed.

EXAMPLE 4 and COMPARISON EXAMPLE 4

93 Parts of ABC resin as prepared in Reference Example 2, 7 parts of a nuclear brominated low molecular weight polycarbonate (polycarbonate of 2,2-bis(4-hydroxy-3,5-dibromophenyl) propane, average degree of polymerization of 3) and 3 parts of diantimony tetroxide of Reference Example 1 were mixed and then melted and kneaded by an extruder to produce pellets of the resin composition. The pellets were molded by injection at a cylinder temperature of 220° C. to produce a test piece, which was then subjected to a burning test in accordance with UL 94 and the appearance of the molded article was observed. The results are shown in Table 4 below.

For comparison, repeating the above mentioned procedure except that 3 parts of diantimony trioxide were used in place of diantimony tetroxide, the resulting composition was tested. The results are shown in Table 4 below as Comparison Example 4.

Table 4

| Antimony oxide | Example 4 Diantimony tetroxide | Comparison Example 4 Diantimony trioxide |
|---|---|---|
| Izod Impact Strength, $\frac{1}{8}$" thick, with a notch (Kg.cm/cm) | 16 | 16 |
| Burning test (UL 94) | V-O | V-O |
| Appearance of the molded article | No silver streak | Silver streak present |

In a similar way to the previous three Examples, the addition of diantimony tetroxide gives better results than the addition of diantimony trioxide.

EXAMPLE 5 and COMPARISON EXAMPLE 5

40 Parts of poly(2,6-dimethylphenylene oxide) having an intrinsic viscosity of 0.54, 60 parts of high impact styrene containing 9% polybutadiene of which the graft ratio is 85%, 15 parts of 2,2-bis(3,5-dibromo-4-hydroxyphenyl) propane carbonate polymer of which the ends are terminated with t-butylphenol and having an average of 3 recurring units, 7 parts of triphenyl phosphate and 3 parts of diantimony tetroxide of Reference Example 1 were thoroughly mixed in a form of powder, and then melted, kneaded and pelletized with an extruder to obtain a resin composition. The resulting pellets were injection-molded at a 280° C. cylinder temperature to produce test pieces.

For comparison, repeating the above procedure except that 3 parts of diantimony trioxide was used in place of diantimony tetroxide, there was obtained a resin composition.

The test results of the resin compositions are as shown below.

Table 5

| | | Example 5 Diantimony tetroxide | Comparison Example 5 Diantimony trioxide |
|---|---|---|---|
| Burning test UL 94 | | V-O | V-O |
| Appearance | Luster | 55 | 30 |

Table 5-continued

| | | Example 5 Diantimony tetroxide | Comparison Example 5 Diantimony trioxide |
|---|---|---|---|
| JIS 874 45° Silver streak | | None | Present |

The resin composition containing 2,2-bis(3,5-dibromo-4-hydroxy) phenyl propane polycarbonate and diantimony tetroxide has a far better appearance than that containing diantimony trioxide.

EXAMPLE 6 and COMPARISON EXAMPLE 6

100 parts of poly(1,4-butylene terephthalate having an intrinsic viscosity of 1.20, 20 parts of 2,2-bis(3,5-dibromo-4-hydroxyphenyl) propane carbonate polymer the ends of which are terminated with t-butylphenol and having an average of three recurring units and 5 parts of diantimony tetroxide were thoroughly mixed in a form of powder, and melted, kneaded and pelletized to obtain a resin composition. These pellets were injection-molded at a cylinder temperature of 260° C. to produce test pieces.

For comparison, repeating the above procedure except that 5 parts of diantimony trioxide was used in place of diantimony tetroxide, the resulting resin composition was tested. The comparison of the test results of both resin compositions is shown in Table 6 below.

Table 6

| | | Example 6 Diantimony tetroxide | Comparison Example 6 Diantimony trioxide |
|---|---|---|---|
| Burning test UL 94 | | V-O | V-O |
| Appearance | Luster | 85 | 50 |
| | JIS 874 45° Silver streak | None | Present |

The resin composition containing 2,2,-bis(3,5-dibromo-4-hydroxy) phenyl propane polycarbonate and diantimony tetroxide has a far better appearance than that containing diantimony trioxide.

We claim:

1. A fire retardant polycarbonate resin composition having improved thermal stability and impact strength which comprises antimony tetroxide and a polycarbonate member selected from the halogen-containing class of (A) halogenated polycarbonates wherein the halogen is bromo or chloro and (B) a mixture of (1) an organic halogen compound containing at least 30 percent by weight of halogen and the decomposition temperature of which is not lower than 250° C., wherein the halogen is bromo or chloro and (2) a polycarbonate, the amount of diantimony tetroxide in (A) and the amount of halogen compound and antimony tetroxide in (B) being sufficient to retard fire in the composition.

2. A fire retardant polycarbonate resin composition according to claim 1 in which the polycarbonate has bis(hydroxyaryl) alkane as a monomeric unit.

3. A fire retardant polycarbonate resin composition according to claim 2 in which the polycarbonate contains at least 70 carbonate bonds.

4. A fire retardant polycarbonate resin composition according to claim 1 in which the halogenated polycarbonate contains at least one nuclear halogenated bis(hydroxyaryl) alkane as a monomeric unit.

5. A fire retardant polycarbonate resin composition according to claim 4 in which the polycarbonate contains at least 70 carbonate bonds.

6. A fire retardant polycarbonate resin composition according to claim 4 in which the nuclear halogenated bis(hydroxyaryl) alkane is selected from a nuclear brominated bis(hydroxyaryl) alkane and a nuclear chlorinated bis(hydroxyaryl) alkane.

7. A fire retardant polycarbonate resin composition according to claim 2 in which the bis(hydroxyaryl) alkane is selected from 2,2-bis(4-hydroxyphenyl) propane and bis(4-hydroxyphenyl) methane.

8. A fire retardant polycarbonate resin composition according to claim 4 in which the nuclear halogenated bis(4-hydroxyaryl) alkane is selected from 2,2-bis(4-hydroxy-3,5-dibromophenyl) propane and 2,2-bis(4-hydroxy-3,5-dichlorophenyl) propane.

9. A fire retardant polycarbonate resin composition according to claim 4 in which the bis(4-hydroxyaryl) alkane is selected from 2,2-bis(4-hydroxyphenyl) propane and bis(4-hydroxyphenyl) methane.

10. A fire retardant polycarbonate resin composition according to claim 1 in which the organic halogen compound is selected from the class of hexabromobenzene, hexabromobiphenyl, 2,2-bis(4-hydroxy-3,5-dibromophenyl) propane, perchloropentacyclodecane, pentabromotoluene, pentabromophenol, tetrabromophthalic anhydride, pentachlorophenol, pentachlorotoluene, decachlorodiphenyl ether and decabromodiphenyl ether.

11. A fire retardant polycarbonate resin composition according to claim 1 in which the diantimony tetroxide is contained in an amount of 0.1–50 parts by weight per 100 parts by weight of the polycarbonate or the halogenated polycarbonate.

12. A fire retardant polycarbonate resin composition according to claim 11 in which the amount of diantimony tetroxide is 0.2–30 parts by weight per 100 parts by weight of the polycarbonate or the halogenated polycarbonate.

13. A fire retardant polycarbonate resin composition according to claim 11 in which the amount of diantimony tetroxide is 0.3–20 parts by weight per 100 parts by weight of the polycarbonate or the halogenated polycarbonate.

14. A fire retardant polycarbonate resin composition according to claim 1 in which the amount of the halogen compound is not more than 20 parts by weight per 100 parts by weight of the polycarbonate.

15. A fire retardant polycarbonate resin composition according to claim 14 in which the amount of the halogen compound is not more than 15 parts by weight per 100 parts by weight of the polycarbonate.

16. A fire retardant polycarbonate resin composition according to claim 14 in which the amount of the halogen compound is not more than 10 parts by weight per 100 parts by weight of the polycarbonate.

17. A fire retardant polycarbonate resin composition according to claim 1 in which there is additionally contained a thermoplastic resin selected from styrene resins, polyolefine resins, and polyester resins.

18. A fire retardant polycarbonate resin composition according to claim 17 in which the styrene resin is selected from acrylonitrile-styrene copolymer, acrylonitrile-chlorostyrene copolymer, acrylonitrilepolybutadiene-styrene copolymer, and acrylonitrile-polybutadiene-chlorostyrene copolymer.

19. A fire retardant polycarbonate resin composition according to claim 17 in which the polyolefine resin is selected from polyethylene, polypropylene and polyvinyl chloride.

20. A fire retardant polycarbonate resin composition which comprises diantimony tetroxide, a brominated or chlorinated polycarbonate, and an organic halogen compound containing at least 30 percent by weight of halogen and the decomposition temperature of which is not lower than 250° C., wherein the halogen is bromo or chloro, the amount of diantimony tetroxide being sufficient to retard fire in the composition.

21. A fire retardant polycarbonate resin composition according to claim 20 in which the amount of the halogen compound is not more than 20 parts by weight per 100 parts by weight of the halogenated polycarbonate.

* * * * *